United States Patent
Gabriel

[11] 3,788,143
[45] Jan. 29, 1974

[54] INTERSTAGE DISC CAVITY REMOVABLE TEMPERATURE PROBE

[75] Inventor: Frank K. Gabriel, Springfield, Pa.

[73] Assignee: Westinghouse Electric Corporation, Pittsburgh, Pa.

[22] Filed: Mar. 17, 1972

[21] Appl. No.: 235,579

[52] U.S. Cl. .............................. 73/346, 73/343 R
[51] Int. Cl. ........................................ G01k 1/14
[58] Field of Search . 73/343 R, 346, 359, 341, 347, 73/362 AR; 136/230, 232

[56] References Cited
UNITED STATES PATENTS
2,911,831  11/1959  Davies.............................. 73/343 R OTHER PUBLICATIONS
Temperature, by the American Institute of Physics, 1941 page 888, 889, 890.

Primary Examiner—Richard C. Queisser
Assistant Examiner—Denis E. Corr
Attorney, Agent, or Firm—A. T. Stratton et al.

[57] ABSTRACT

A temperature probe for gas turbines, the probe having a flexible end which is inserted through the casing, a stationary blade and an arcuate tubular guide to enter an interstage disc cavity adjacent a rotor blade disc to determine the temperature of a gaseous coolant within the cavity to indicate the temperature of the rotor blade disc.

9 Claims, 3 Drawing Figures

INTERSTAGE DISC CAVITY REMOVABLE TEMPERATURE PROBE

BACKGROUND OF THE INVENTION

This invention relates to gas turbines and more particularly to a probe for measuring the temperature in an interstage disc cavity of a gas turbine.

One of the most critical components of a gas turbine is the rotor disc which is exposed to high centrifugal stresses and high temperatures. Therefore, it is advantageous to have a continuous indication of the temperature of the metal forming the rotor disc. Taking direct temperature readings would involve some type of slip ring assembly, a complex induction system or a telemetering system. Therefore, in lieu of measuring the temperature of the rotor disc directly, the temperature of the gases surrounding the rotor discs or the temperature in the interstage disc cavity can be measured. To provide accurate measurement of this temperature it is necessary that the probe enter an accessible area and terminate in the disc cavity region by virtue of a flexible sensing section. To do this reliably and without expensive disassembly of the machine, the entire probe must be arranged to facilitate inspection, calibration, and replacement.

SUMMARY OF THE INVENTION

A probe for sensing the temperature of a gaseous coolant in an interstage cavity of a gas turbine, wherein the interstage cavity is adjacent a rotor blade disc, when made in accordance with this invention, comprises a temperature sensing device such as a thermocouple, leads extending from the thermocouple, and a shield enwrapping the leads and thermocouple. The shield comprises a substantially rigid portion, a flexible end portion having a free end, which contains the measuring junction, and a transition portion connecting the rigid portion to the flexible portion. The probe also utilizes guides for receiving the shield and for directing the free end of the flexible portion thereof to the interstage cavity.

BRIEF DESCRIPTION OF THE DRAWINGS

The objects and advantages of this invention will become more apparent from reading the following detailed description in connection with the accompanying drawings, in which.

BRIEF DESCRIPTION OF THE PREFERRED EMBODIMENT

Figure 1:
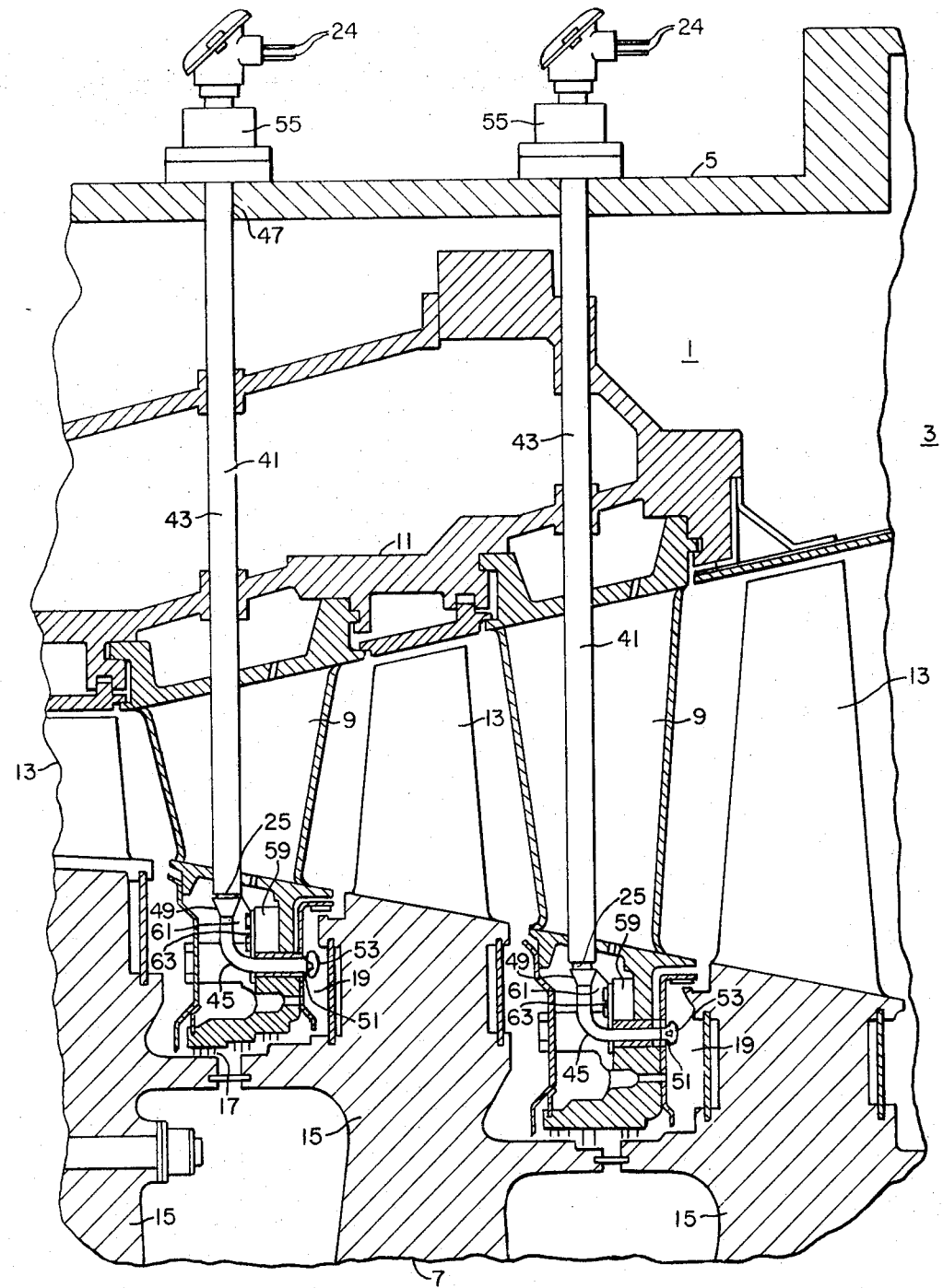
FIG. 1 is a partial sectional view of a gas turbine having a temperature probe for measuring the temperature of the interstage rotor disc cavity made in accordance with this invention.

Referring now to the drawings in detail, FIG. 1 shows a turbine portion 1 of a gas turbine 3 or elastic fluid machine having a casing or cylinder 5 encircling a rotor 7. A plurality of annular rows of stationary blades or stator vanes 9 are disposed in a blade ring 11 disposed within the casing 5 and fastened thereto. A plurality of annular arrays of rotatable or rotor blades 13 are disposed around a plurality of rotor discs 15 which are fastened together to form a portion of the rotor 7. Labyrinth type seals 17 are fastened to the inner diameter of the sationary vanes 9 to form an interstage seal adjacent the rotor 7. Annular interstage disc cavities 19 are formed upstream of the rotor discs 15 adjacent the area where the root of the rotor blade 13 is fastened to the rotor disc 15.

A gaseous coolant, generally compressed air, flows through the stator vane 9 and into the interstage disc cavity 19. An apparatus for sensing the temperature of the gaseous coolant in the interstage cavity 19 is shown to comprise a thermocouple 23, however other temperature sensing means such as a thermistor or liquid filled temperature bulb could be utilized. The thermocouple 23 has two lead wires 24 extending therefrom. The lead wires may be stranded wire covered by heat resistant insulating material or the lead wires 24 maybe disposed in a plurality of small segmented creamic double bore insulators. Thee wires 24 and insulation are disposed in a metallic sheath or shield 25. One end of the shield 25 is a conduit 27 and is generally ridgid, while the other end, the end containing the thermocouple, is a spiral wound flexible metallic tube 29 capable of bending 90° or more. The free end of the flexible metallic tube 29 contains a metallic bulb 31 which houses the thermocouple 23 or measuring junction. A frustoconical transition member 33 connects the conduit 27 to the flexible tube 29, the latter being smaller in diameter. The shield thus formed is generally gas tight.

The end of the conduit opposite the transition member 33 has a flange 35 and an annular groove 37 disposed adjacent the flange. The groove 37 is adapted to receive an O-ring 39 or similar packing gland which forms a gas tight seal around the conduit 27.

Guide means 41 are adapted to receive the shield 25 and direct the free end 31 containing the thermocouple measuring junction 23 to the interstage cavity 19 and comprises a conduit portion 43 and an arcuate tubular portion 45.

Figure 3:
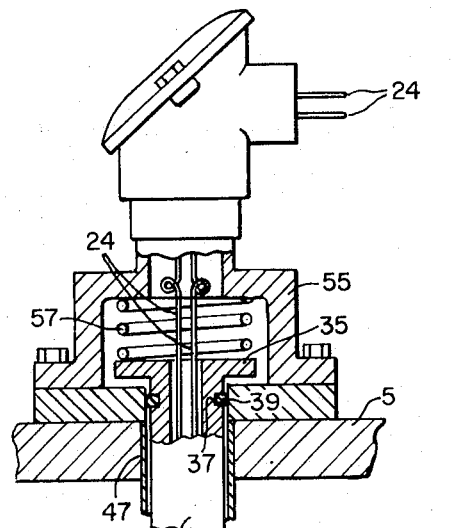
FIG. 3 is a partial sectional view taken on line III—III of FIG. 2.
Figure 2:
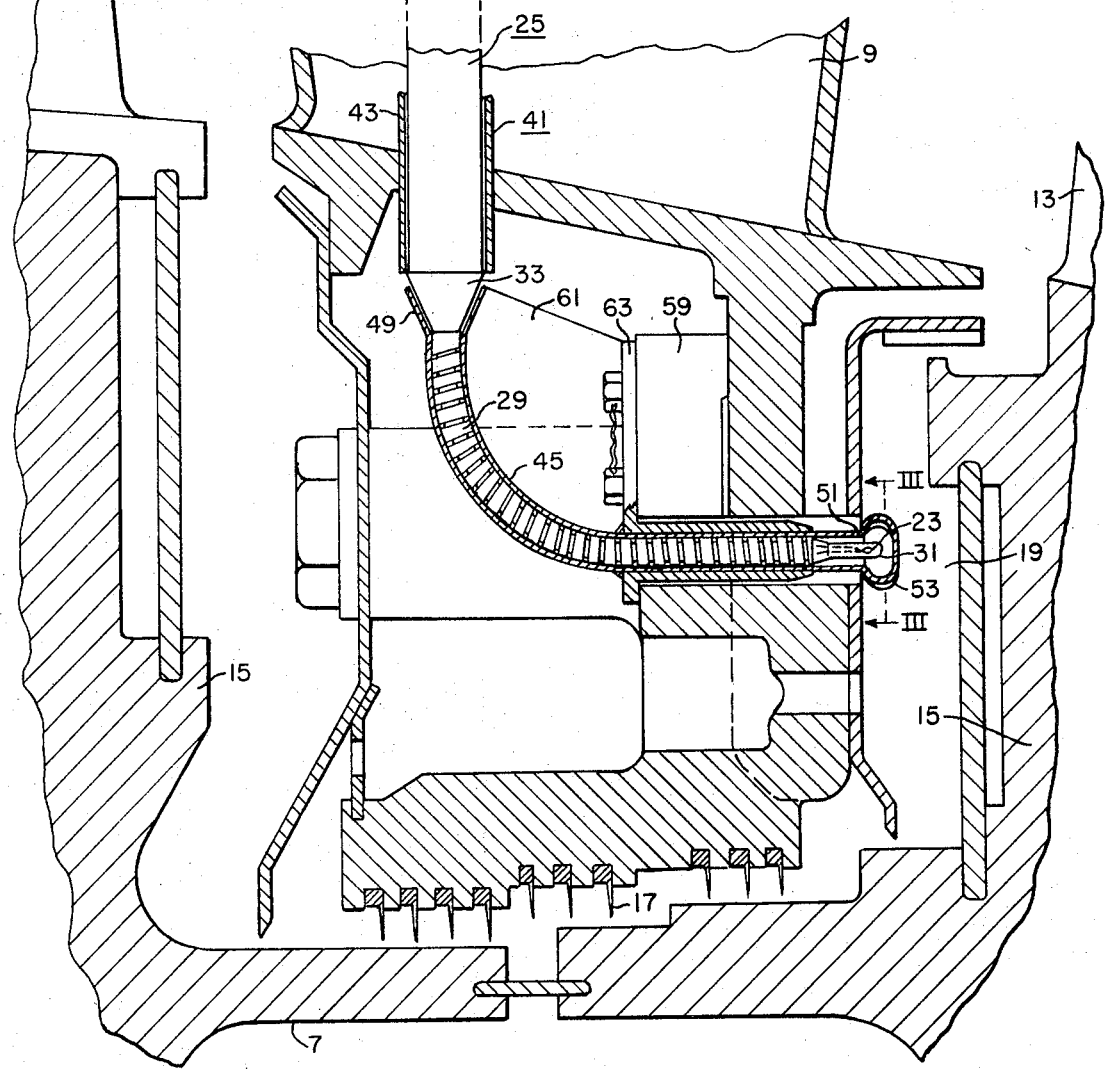
FIG. 2 is an enlarged partial sectional view similar to FIG. 1 showing the temperature probe in more detail.

The conduit portion 43 passes through an opening 47 in the cylinder 5 and is seal welded thereto and then extends through a stator vane 9 and the terminates adjacent one end 49 of the tubular arcuate portion 45, which is enlarged so that it is funnel or frustoconical shaped. The arcuate tubular portion bends approximately 90° from the funnel shaped end 49, which is disposed radially, to its other end 51, which is in communication with the interstage cavity 19. The end 51 in communication with the interstage cavity, as shown in FIGS. 2 and 3, has a radiation shield 53 connected thereto. The radiation shield 53 is an arcuate tube open on both ends and generally has a curvature with a radius equal to the distance from the center of the rotor. The radiation shield 53 also has a generally oblong cross section and the openings are disposed circumferentially so as to permit maximum flow of coolant therethrough and across the bulb 31, which is disposed at the free end of the flexible portion of the sheath 25 and contains the thermocouple measuring junction 23. Thus, acurately sensing the temperature of the coolant as it swirls with the rotor.

The frustoconical transition member 33 of the shield 25 and the frustoconical end 49 of the guide means 41 generally have the same slope and cooperate to form a gas tight seal when they engage.

A cup-shaped cap 55 is disposed over the flanged end 35 of the sheild 25 and a coil spring 57 is interposed between the cap 55 and the flange 35 biasing the transition portion 33 of the shield 25 toward the enlarged end 49 of the arcuate portion 45 of the guide means 41 forcing them into engagement and resulting in a gas tight seal therebetween to prevent coolant from flowing to and from the interstage cavity via the arcuate tubular portion 45 of the guide means 41.

The conduit portion 43 of the guide means 41 engages the cylinder 5 and is fastened thereto and, therefore, moves with the cylinder, while thhe arcuate portion 45 of the guide means 41 is fastened to a stator vane ring 59 by a support bracket 61 and plate 63 which is bolted to the ring 59. The conduit 43 and expanded end 49 of the arcuate portion 45 being in axial alignment and being spaced apart allows for thermal expansion of the various components forming the turbine 3 and permits the probe or shield 25 to be easily inserted into the guide means 41 and directed towards the interstage cavity 19. The spiral wound flexible end 29 of the shield 25 when inserted in the arcuate portion 45 of the guide member 41 advantageously forms a labyrinth seal to minimize coolant leakage through the arcuate tube member 45 to form a secondary seal as a backup for the primary seal formed between the transition portion 33 of the shield 25 and enlarged portion 49 of the guide member 41.

The removable temperature probe 25, as hereinbefore described, besides providing for inspection, calibration of the thermocouple, and simple replacement when required also advantageously provides an accurate indication of the temperature of the rotor blade disc by positioning a thermocouple measuring junction adjacent the disc along with a radiation shield adapted to provide the necessary circulation of coolant around the bulb containing the thermocouple measuring junction 23.

What is claimed is:

1. Apparatus for sensing the temperature of a fluid in an interstage cavity of an elastic fluid machine, wherein the interstage cavity is adjacent a rotor blade disc, said apparatus comprising temperature sensing means,
at least one lead extending from said sensing means,
a shield enwrapping said lead and sensing means,
said shield comprising a substantially rigid portion,
  a flexible end portion having a free end which contains said sensing means and a transition portion connecting said rigid portion to said flexible portion, and
guide means for receiving the shield and for directing said free end of said flexible portion thereof to said interstage cavity, said guide means comprising an arcuate tubular portion which directs, positions and locates the flexible portion of the shield in the interstage cavity.

2. Apparatus as set forth in claim 1, wherein one end of the arcuate tubular portion is enlarged for receiving the flexible portion of the shield, said enlarged portion also being adapted to cooperate with the transition portion of the shield to form a gas tight seal between the transition portion and the arcuate tubular portion to prevent fluid from flowing through said arcuate tubular portion.

3. Apparatus as set forth in claim 2 and further comprising biasing means for forcing the transition portion of the shield into engagement with the enlarged portion of the arcuate tubular portion of the guide means.

4. Apparatus as set forth in claim 3, wherein the biasing means is a spring and the transition portion of the shield and the enlarged portion of the arcuate tubular portion of the guide means are frustoconical shaped and have sides of generally equal slope, whereby they cooperate to form a gas tight seal as they are forced into engagement by the springs.

5. Apparatus as set forth in claim 1, wherein the temperature sensing means is an electrical temperature sensing means and has two leads extending therefrom.

6. Apparatus as set forth in claim 1, wherein the temperature sensing means is a thermocouple and has two leads extending therefrom.

7. Apparatus as set forth in claim 1, wherein the arcuate tubular portion of the guide means has a radiation shield disposed on one end thereof, said radiation shield having openings which permit fluid to flow over the free end of the shield which contains the temperature sensing means.

8. Apparatus as set forth in claim 7, wherein the radiation shield is an arcuate tube having an oblong cross section.

9. Apparatus as set forth in claim 1, wherein the machine has a casing which contains the fluid and the shield extends through the casing and has sealing means disposed around the shield as it passes through the casing to prevent fluid from escaping from the casing.

* * * * *